United States Patent
Akada et al.

(10) Patent No.: US 8,151,949 B2
(45) Date of Patent: Apr. 10, 2012

(54) DRUM BRAKE APPARATUS

(75) Inventors: Hironori Akada, Tokyo (JP); Masaki Uchida, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 393 days.

(21) Appl. No.: 12/464,251

(22) Filed: May 12, 2009

(65) Prior Publication Data

US 2009/0283374 A1 Nov. 19, 2009

(30) Foreign Application Priority Data

May 14, 2008 (JP) .................................. 2008-127243

(51) Int. Cl.
*F16D 51/00* (2006.01)
(52) U.S. Cl. ........ 188/74; 188/250 B; 188/258; 188/340
(58) Field of Classification Search ............ 188/74, 188/75, 247, 250 B, 250 D, 250 E, 250 R, 188/258, 325, 327, 328, 340
See application file for complete search history.

(56) References Cited

U.S. PATENT DOCUMENTS

| | | | | | |
|---|---|---|---|---|---|
| 2,544,030 | A | * | 3/1951 | House | 188/340 |
| RE24,886 | E | * | 10/1960 | Brown, Jr. | 188/78 |
| 3,061,051 | A | * | 10/1962 | Swift | 188/340 |
| 3,255,849 | A | * | 6/1966 | Swift | 188/325 |
| 3,351,159 | A | * | 11/1967 | Burnett | 188/341 |
| 4,353,441 | A | * | 10/1982 | Roberts | 188/328 |
| 2007/0199777 | A1 | * | 8/2007 | Akada | 188/195 |

FOREIGN PATENT DOCUMENTS

JP 2-101138 8/1990

* cited by examiner

*Primary Examiner* — Pamela Rodriguez
(74) *Attorney, Agent, or Firm* — Drinker Biddle & Reath LLP

(57) ABSTRACT

A drum brake apparatus is provided with a backing plate, a brake shoe, a shoe guide portion formed integrally with a backing plate by cutting and press molding, a guide surface on a rear surface of the shoe guide portion, an engagement projection that is formed on the brake shoe and slidably engages with the guide surface, and end portions that is formed on the shoe guide portion at both ends of the shoe guide portion in a circumferential direction of the drum brake apparatus and is continuous to the backing plate. Uplift of the brake shoe from the backing plate is prevented by engagement between the guide surface and the engagement projection.

4 Claims, 7 Drawing Sheets

DRUM BRAKE APPARATUS

BACKGROUND OF THE INVENTION

1. Field of the Invention

The present invention relates to a vehicle drum brake apparatus, and particularly to improvement of a shoe hold-down mechanism for holding a brake shoe on a backing plate so that the brake shoe does not lift from the backing plate.

2. Background Art

According to a conventional drum brake apparatus, in a shoe hold-down mechanism for holding a brake shoe on a backing plate so that the brake shoe does not lift from the backing plate, there has been widely used a hold-down pin which is fixed to the backing plate through a web of the brake shoe, a spring receiver locked onto a head side of the hold-down pin protruding from the web, and a helical compression spring which lies between the spring receiver and the web in a compressed state thereby to urge the web to the backing plate side.

However, such the shoe hold-down mechanism causes increase in number of parts and increase in number of assembly steps, so that cost increase of the drum brake apparatus is caused.

Therefore, as shown in FIGS. 10 and 11, a drum brake apparatus having an improved shoe hold-down mechanism has been developed.

A drum brake apparatus 101 shown in FIGS. 10 and 11 has been disclosed in JP-U-02-101138, which constitutes a shoe hold-down mechanism by a shoe guide portion 105 formed integrally with a backing plate 103 by cutting and press molding, and engagement projections 107b, 108b formed integrally with rims 107a, 108a of a pair of brake shoes 107, 108 arranged on the backing plate 103 oppositely to each other.

The shoe guide portion 105 is formed integrally with the backing plate 103 by the cutting and press molding so that its rear surface becomes a flat guide surface 105a which is parallel to the backing plate 103.

Further, the engagement projections 107b, 108b are formed integrally with each rim 107a, 108a so that their upper surfaces become parallel to the backing plate 103. The engagement projections 107b, 108b engage with the guide surface 105a slidably, whereby each brake shoe 107, 108 is prevented from lifting from the backing plate 103.

Such the shoe hold-down mechanism, compared with the conventional shoe hold-down mechanism using the hold-down pin fixed onto the backing plate through the web of the brake shoe, becomes small in the number of parts and the number of assembly steps. Therefore, cost reduction of the drum brake apparatus can be realized.

However, the shoe guide portion 105 in the drum brake apparatus 101 shown in FIGS. 10 and 11, since both end edges 105b, 105c of the shoe guide portion 105 in a circumferential direction of the drum brake apparatus are cut off from the backing plate 103, it is difficult to secure rigidity which is enough so that the shoe guide portion 105 is not substantially deformed by bending moment M. Therefore, there is fear that parallelism between the guide surface 105a and the backing plate 103 lowers due to the deformation of the shoe guide portion 105 thereby to cause lowering of uplift preventing performance of the brake shoes 107, 108, or that the smooth slide of the brake shoes 107, 108 on the backing plate 103 is impaired.

Further, since the shoe guide portion 105 is formed by the cutting and press molding, an aperture 109 is formed in the backing plate 103 on the lower side of the shoe guide portion 105.

If this aperture 109 is left open, rain water readily enter from the outside into the inside, so that there is fear that braking performance is affected by entry of the rain water, or that internal parts become dusty.

Therefore, it is necessary to join a sealing plate material which boards up the aperture 109 onto the rear surface of the backing plate 103. However, depending on the joint structure, there is fear that various problems which impair productivity are produced.

For example, in case that welding is adopted as joint means, such a limit on step that a surface treatment step of the backing plate must be performed after welding of the sealing plate material is produced, so that process control management becomes difficult.

Further, in case that screwing or riveting is adopted as the joint means, a through-hole for insertion of a screw or a rivet must be provided in advance in the backing plate 103 and the sealing plate material. Therefore, there is fear that the increase in machining cost by these machining causes increase in cost of products, or that productivity lowers due to increase in number of machining steps.

SUMMARY OF THE INVENTION

One or more embodiments of the invention provide a drum brake apparatus which can surely prevent a brake shoe from lifting by providing sufficient rigidity for a shoe guide portion as a shoe hold-down mechanism formed integrally with a backing plate by cutting-up, and can keep the smooth sliding operation of the brake shoe on the backing plate.

In accordance with one or more embodiments of the invention, a drum brake apparatus is provided with: a backing plate; a brake shoe; a shoe guide portion formed integrally with a backing plate by cutting and press molding; a guide surface on a rear surface of the shoe guide portion; an engagement projection that is formed on the brake shoe and slidably engages with the guide surface, wherein uplift of the brake shoe from the backing plate is prevented by engagement between the guide surface and the engagement projection; and end portions that is formed on the shoe guide portion at both ends of the shoe guide portion in a circumferential direction of the drum brake apparatus and is continuous to the backing plate.

The drum brake apparatus may further include an inner end portion that is formed on the shoe guide portion at an inner end of the shoe guide portion in a radial direction of the drum brake apparatus and is continuous to the backing plate.

The brake apparatus may further include a reinforcement plate secured onto a rear surface of the backing plate so as to board up an aperture formed in the backing plate by the cutting and press molding of the shoe guide portion.

The drum brake apparatus may further include a punching portion at which the backing plate and the reinforcement plate are superimposed and bent together and the backing plate and the reinforcement plate are caulked and secured to each other.

In the above drum brake apparatus, by the shoe hold-down mechanism for holding the brake shoe on the backing plate, the engagement projection formed integrally with the brake shoe is engaged with the guide surface on the rear surface of the shoe guide portion formed integrally with the backing plate by the cutting and press molding.

Since the both end portions of the shoe guide portion spaced in the circumferential direction continue to (do not cut off from) the backing plate, the shoe guide portion formed integrally with the backing plate by the cutting and press molding becomes to have high rigidity, so that it is possible to prevent deformation of the shoe guide portion from being produced due to bending moment.

Accordingly, decrease in parallelism between the guide surface and the backing plate due to the deformation of the shoe guide portion is not produced. Therefore, the uplift of the brake shoe can be surely prevented, and simultaneously the smooth sliding operation can be provided for the brake shoe on the backing plate.

Other aspects and advantages of the invention will be apparent from the following description, the drawings and the claims.

DETAILED DESCRIPTION OF THE EXEMPLARY EMBODIMENTS

Exemplary embodiments of the invention will be described with reference to drawings.

First Exemplary Embodiment

Figure 1:
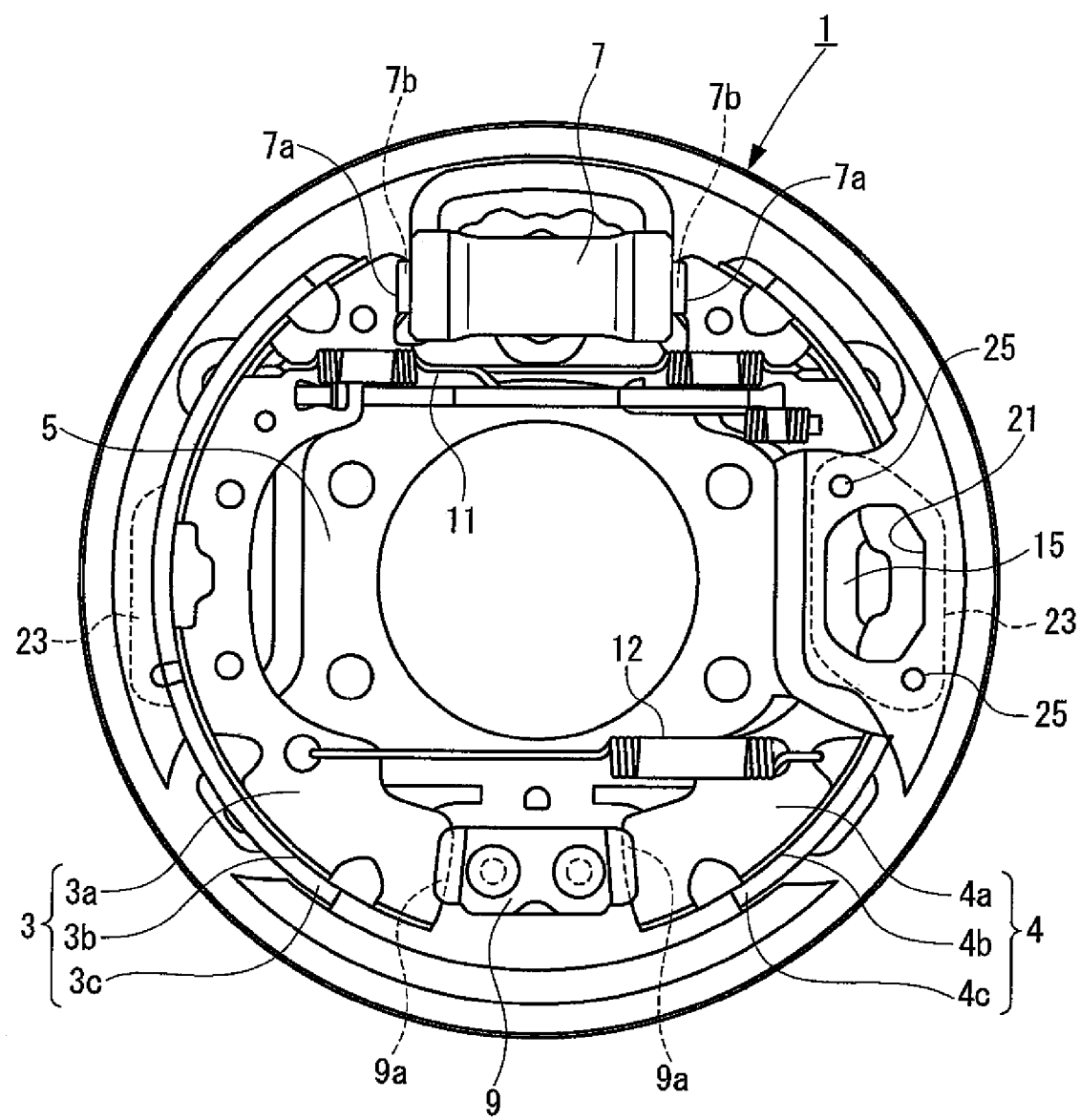
FIG. 1 is a front view of a drum brake apparatus of a first exemplary embodiment of the invention.
Figure 2:
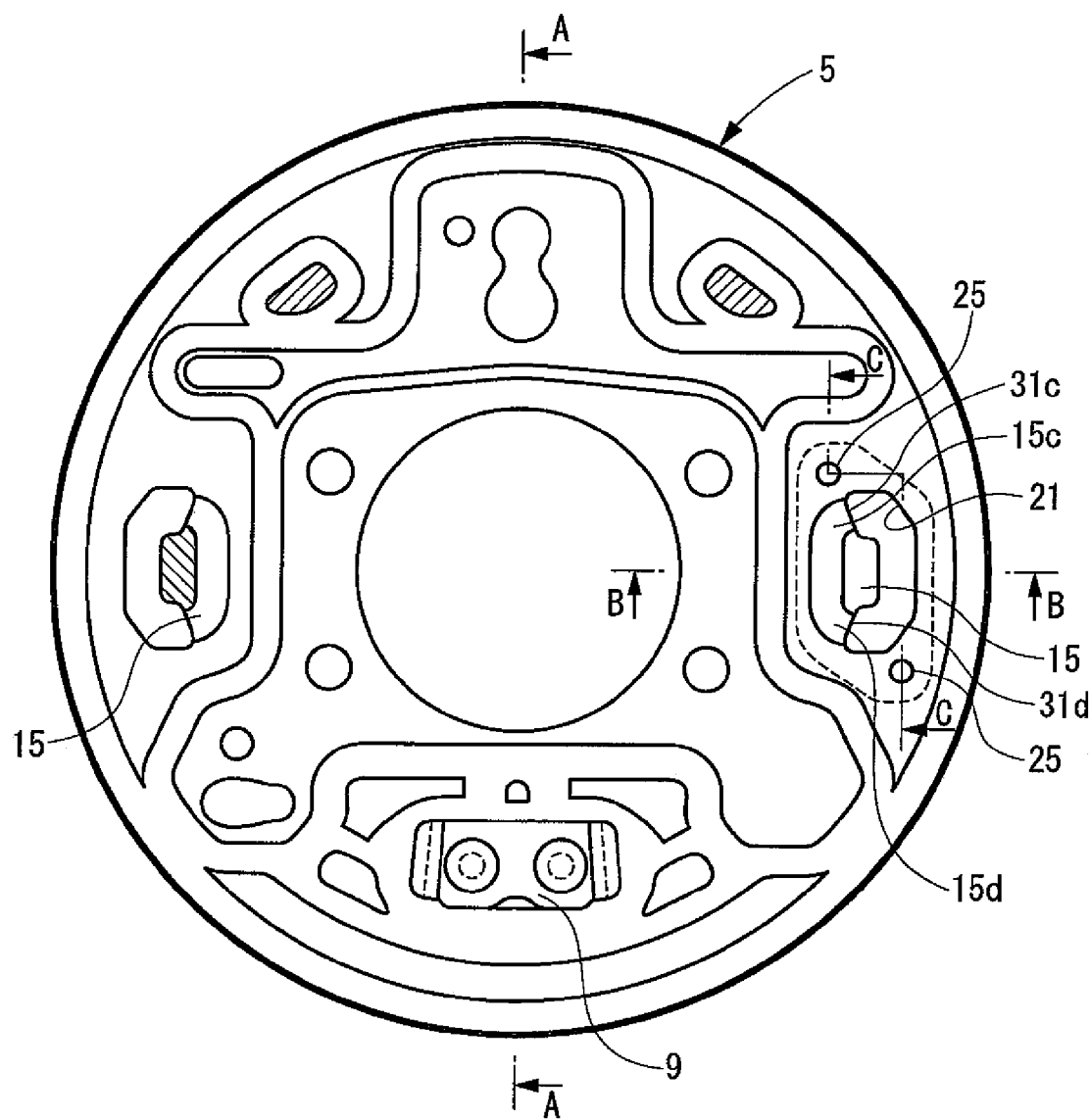
FIG. 2 is a front view of a backing plate alone of the drum brake apparatus shown in FIG. 1.
Figure 3:
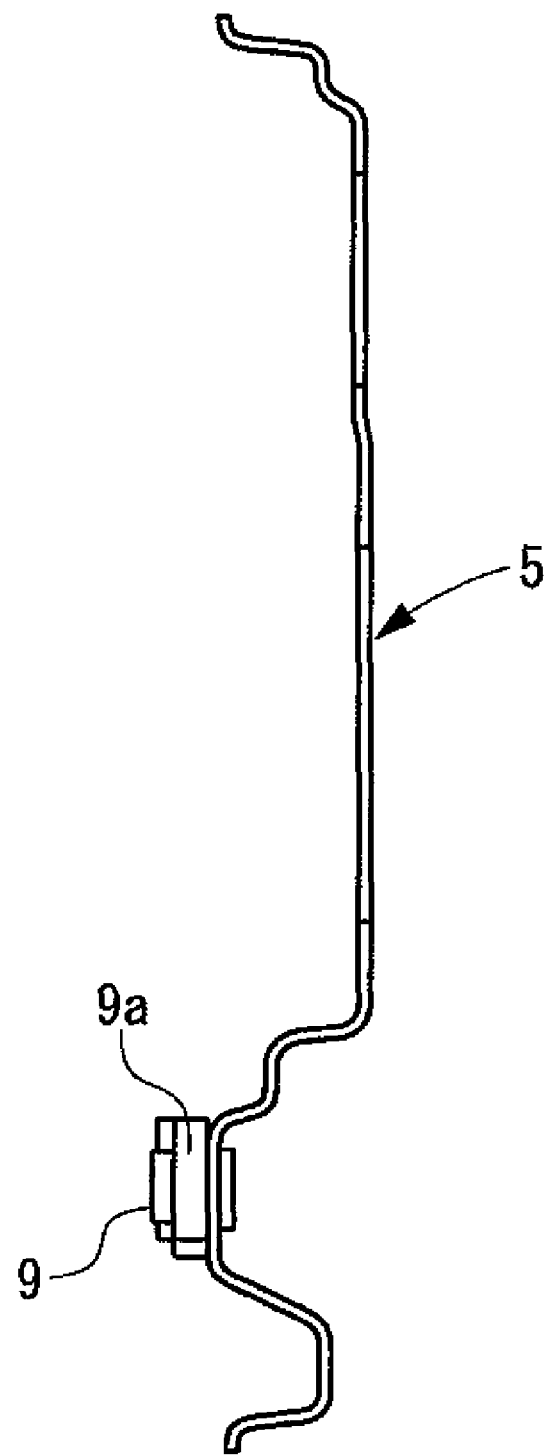
FIG. 3 is a sectional view taken along a line A-A in FIG. 2.
Figure 4:
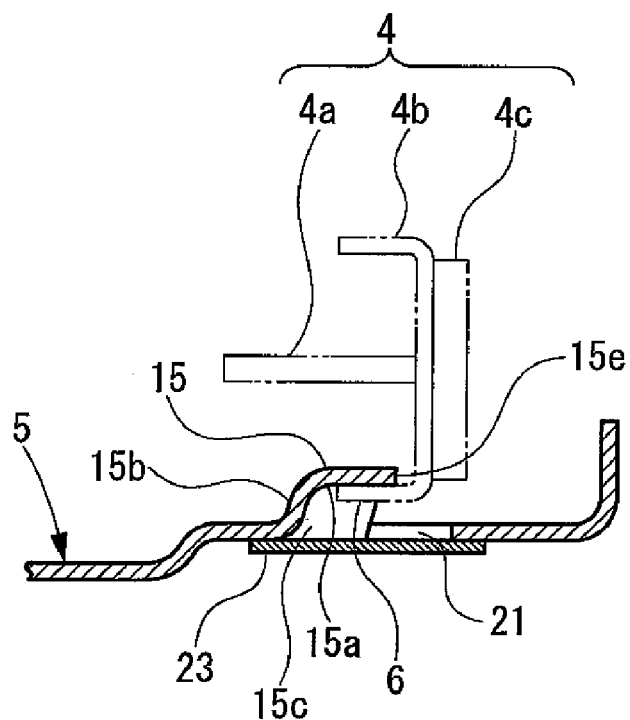
FIG. 4 is a sectional view taken along a line B-B in FIG. 2.
Figure 5:
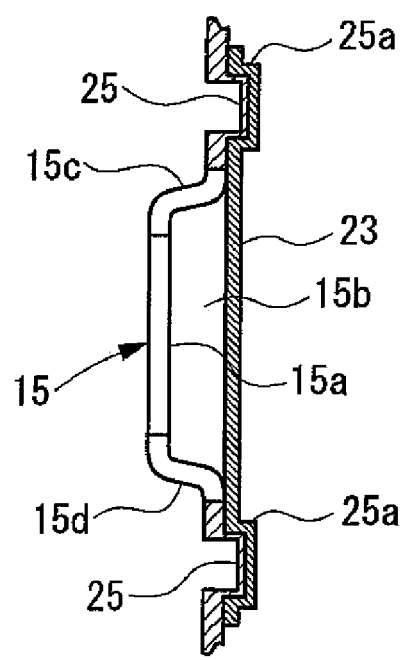
FIG. 5 is a sectional view taken along a line C-C in FIG. 2.

FIG. 1 is a front view of a drum brake apparatus according to a first exemplary embodiment of the invention, FIG. 2 is a front view of a backing plate alone of the drum brake apparatus shown in FIG. 1, FIG. 3 is a sectional view taken along a line A-A in FIG. 2, FIG. 4 is a sectional view taken along a line B-B in FIG. 2, FIG. 5 is a sectional view taken along a line C-C in FIG. 2, and FIG. 6 is a diagram for explaining steps of a bending joint method by which a securing portion between the backing plate and a reinforcement plate is formed.

A drum brake apparatus 1 in this embodiment is used as a usual braking system or a parking brake, which includes a pair of brake shoes 3, 4 arranged oppositely to each other on the inside of a cylindrical brake drum (not shown); a wheel cylinder 7 which is fixed to the backing plate 5 between one-end portions of the pair of these brake shoes 3, 4 opposing to each other, and has at both ends pistons 7a, 7a that press these brake shoes 3, 4 toward the inner surface of the brake drum; an anchor member 9 which is a support member that is secured to the backing plate 5 between the other end portions of the pair of brake shoes 3, 4 opposing to each other and supports the end portions of the brake shoes, and which receives brake force at the braking time; and shoe return springs 11, 12 which separate the pair of brake shoes 3, 4 from the inner surface of the brake drum at the non-braking time.

The pair of brake shoes 3, 4 include webs 3a, 4a parallel to the backing plate 5, rims 3b, 4b disposed on peripheral surfaces of these webs 3a, 4a perpendicularly to the backing plate 5, and linings 3c, 4c secured to peripheral surfaces of these rims 3b, 4b.

The shoe return spring 11 urges each brake shoe 3, 4 in a direction where the brake shoes 3, 4 come close to each other so that a state where the end on the wheel cylinder 7 side of the web 3a, 4a of each brake shoe 3, 4 abuts on the piston 7a is kept. For each piston 7a of the wheel cylinder 7, there is provided a groove portion 7b which holds the end portion of the web 3a, 4a unmovably in an axle direction.

The shoe return spring 12 urges each brake shoe 3, 4 in a direction where the brake shoes 3, 4 come close to each other so that a state where the end on the anchor member 9 side of the web 3a, 4a of each brake shoe 3, 4 abuts on the anchor member 9 is kept. At both ends of the anchor member 9 which the webs 3a, 4a abut on, there are provided groove portions 9b which hold the end portions of the webs 3a, 4a unmovably in an axle direction.

In the drum brake apparatus 1 in the embodiment, a shoe guide portion 15 having a rear surface functioning as a guide surface 15a is formed integrally with the backing plate 5 by cutting and press molding. The shoe guide portion 15, as shown in FIG. 2, is provided for each brake shoe 3, 4 near an intermediate position of each brake shoe in a circumferential direction of the drum brake apparatus 1.

Further, near the intermediate position in the circumferential direction of the rim 3b, 4b of each brake shoe 3, 4, as shown in FIG. 4, an engagement projection 6 which engages slidably with the guide surface 15a is projected integrally.

In the drum brake apparatus 1 in the embodiment, the guide surface 15a of the shoe guide portion 15 is located so as to be overlaid on the engagement projection 6 to engage with the engagement projection 6, and functions as a shoe hold-down mechanism which prevents uplift of the brake shoes 3, 4 from the backing plate 5.

The guide surface 15a of the shoe guide portion 15, in order to prevent the uplift of the engagement projection 6 by holding the engagement projection 6 from the upside and simultaneously smooth the sliding operation of each brake shoe 3, 4 on a ledge surface (a bulging flat surface portion on which a side edge of the rim 3b, 4b of the brake shoe 3, 4 abuts slidably) of the backing plate 5, is formed in the shape of a plane parallel to the backing plate 6.

In the drum brake apparatus 1 in the embodiment, the shoe guide portion 15, as shown in FIG. 5, is formed in such a shape that both end portions 15c, 15d in the circumferential direction of the shoe guide portion 15 continue to the backing plate 5 (are not cut off from the backing plate 5). Further, as shown in FIG. 4, an inner end portion 15b formed at an inner end of the shoe guide portion 15 in a radial direction of the drum brake apparatus also continues to the backing plate 5. Namely, the guide surface 15a of the shoe guide portion 15 continues to the backing plate 5 at its three sides, and only an end edge 15e in an outer side thereof in the radial direction is cut off from the backing plate 5.

Further, in the embodiment, onto the rear surface of the backing plate 5, a reinforcement plate 23 is secured so as to board up an aperture 21 formed in the backing plate 5 by cutting and press molding of the shoe guide portion 15.

Securing of this backing plate 5 and the reinforcement plate 23 is performed, in a state where these backing plate 5 and reinforcement plate 23 are superimposed together, by a bending joint method in which they are caulked by means of special punch and die (so-called Tog-L-Loc Steel metal clinching method).

In FIGS. 2 and 5, a portion denoted by a reference numeral 25 is a punching portion caulked by the Tog-L-Loc Steel metal clinching method.

The punching portion 25, as shown in FIG. 5, is formed in the concave shape in which the joint portion between the backing plate 5 and the reinforcement plate 23 does not go through, and a peripheral edge 25a of a bottom portion of the punching portion 25 becomes a caulking portion.

Figures 6A, 6B:
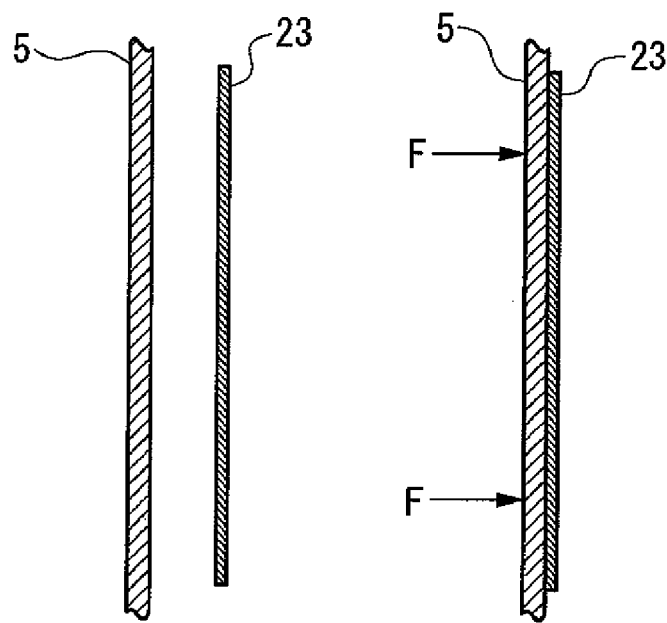
FIGS. 6(a) and 6(b) are diagrams for explaining steps of a bending joint method by which a securing portion between the backing plate and a reinforcement plate which is shown in FIG. 5 is formed.

The punching portion 25 is formed as follows: firstly, as shown in FIG. 6(a), the backing plate 5 and the reinforcement plate 23 to be joined to each other are set so as to be opposed to each other; as shown in FIG. 6(b), they are brought into close contact with each other in an superimposing state; and a portion requiring the joint (portion shown by an arrow F in the figure) is punched by means of special punch and die.

In the above-explained drum brake apparatus 1, by the shoe hold-down mechanism for engaging the brake shoe 3, 4 with the backing plate 5, the engagement projection 6 formed integrally with the brake shoes 3, 4 is engaged with the guide surface 15a which is the rear surface of the shoe guide portion 15 formed integrally with the backing plate 5 by the cutting-up. Compared with a drum brake apparatus adopting a conventional shoe hold-down mechanism which uses a hold-down pin that penetrates the web of the brake shoe and fixed to the backing plate, the number of parts and the number of assembly steps are reduced. Therefore, cost reduction of the drum brake apparatus can be realized.

Further, the shoe guide portion 15 cut up from the backing plate 5, since the both end portions 15c and 15d spaced in the circumferential direction of the backing plate 5 continue to the backing plate 5, becomes high in rigidity, so that it is possible to prevent deformation of the shoe guide portion 15 from being produced due to bending moment.

Accordingly, decrease in parallelism between the guide surface 15a and the backing plate 5 by the deformation of the shoe guide portion 15 is not produced. Therefore, the uplift of the brake shoe 3, 4 can be surely prevented, and simultaneously the smooth sliding operation can be provided for the brake shoe 3, 4 on the backing plate 5.

Further, in the drum brake apparatus 1 in the embodiment, onto the rear surface of the backing plate 5, the reinforcement plate 23 is secured so as to board up the aperture 21 formed in the backing plate 5 by the cutting and press molding of the shoe guide portion 15.

Therefore, rigidity of the aperture 21 surroundings which support the shoe guide portion 15 becomes high, with the result that rigidity of the shoe guide portion 15 becomes also high, and the uplift of the brake shoe 3, 4 can be more surely prevented by the shoe guide portion 15.

Further, since the aperture 21 is boarded up by the reinforcement plate 23, it is possible to prevent rain water from entering the inside of the backing plate from the aperture 21, so that it is possible to restrain braking performance from being affected by the entry of the rain water into the backing plate 5 inside.

Further, securing of the backing plate 5 and the reinforcement plate 23 is performed, in the state where these backing plate 5 and reinforcement plate 23 are superimposed on each other, by the Tog-L-Loc Steel metal clinching method in which they are caulked by means of the special punch and die.

In the joint by this Tog-L-Loc Steel metal clinching method, when the superimposed backing plate 5 and the reinforcement plate 23 are caulked together, peeling-off is not produced in surface treatment coating on their respective joint surfaces. Therefore, by subjecting individually their respective parts to the surface treatment in advance in a single part state, the surface treatment in the assembly state after the joint can be omitted, with the result that production cost can be reduced by the reduction of the treatment step.

Further, in the Tog-L-Loc Steel metal clinching method, when the superimposed backing plate 5 and the reinforcement plate 23 are caulked together, it is not necessary to subject the respective members to be joined together to pretreatment such as perforation or dowel-formation in advance. Therefore, the number of machining steps in each of the respective joint parts can be reduced, whereby parts-cost can be reduced.

Further, in the Tog-L-Loc Steel metal clinching method, since alignment of the members to be joined together is also readily performed compared with a case of joint by another joint method such as a welding method, the Tog-L-Loc Steel metal clinching method is advantageous for automatization of the joint operation between the backing plate 5 and the reinforcement plate 23.

Further, in the Tog-L-Loc Steel metal clinching method, compared with a case of joint by a welding method, there are not disadvantages in joint such as generation of strain due to a heat influence and soil due to attachment of spatter. Therefore, without detriment to molding accuracy in a single part of each of the backing plate 5 and the reinforcement plate 23, the both parts can be joined together with high accuracy to become an assembled body. Therefore, high sealing performance can be provided between the joined backing plate 5 and reinforcement plate 23, whereby water-proof performance is improved, and simultaneously product quality can be improved.

Further, in the Tog-L-Loc Steel metal clinching method, it is enough that management of joint strength in the joint portion is performed by only the measurement of a joint diameter. Therefore, since a breaking test is not required, the joint strength management is facilitated.

The shape of the both end portions 15c, 15d of the shoe guide portion 15 formed integrally with the backing plate 5 can be appropriately adjusted by improving a press mold used in the cutting-up.

Second Exemplary Embodiment

Figure 7:
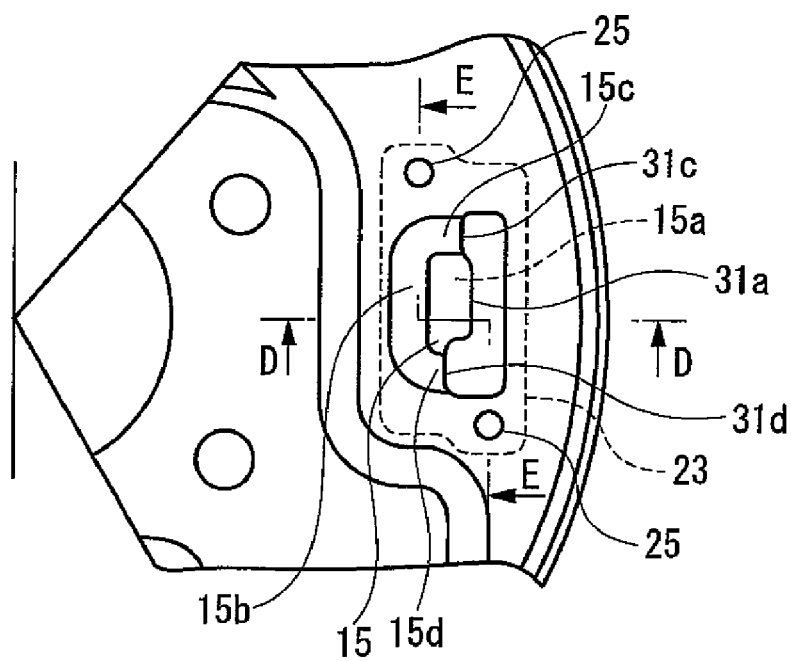
FIG. 7 is a main portion front view of a backing plate in a drum brake apparatus according to a second exemplary embodiment of the invention.
Figure 8:
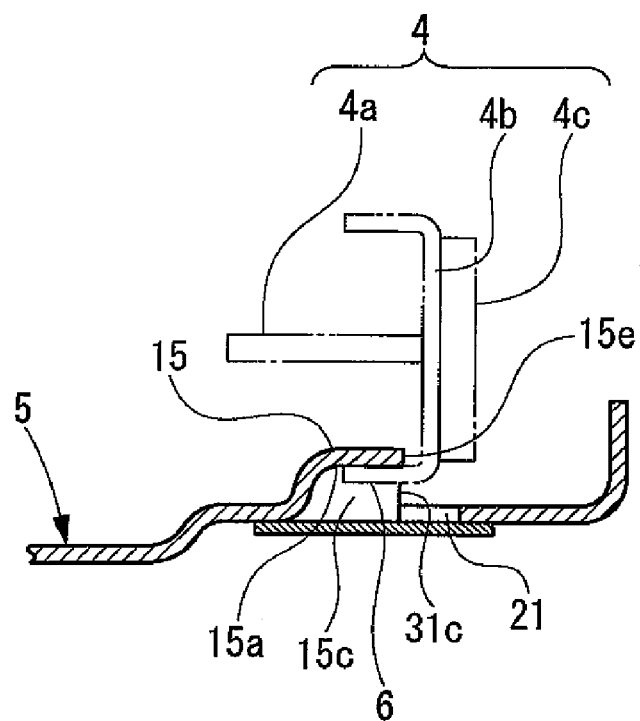
FIG. 8 is a sectional view taken along a line D-D in FIG. 7.
Figure 9:
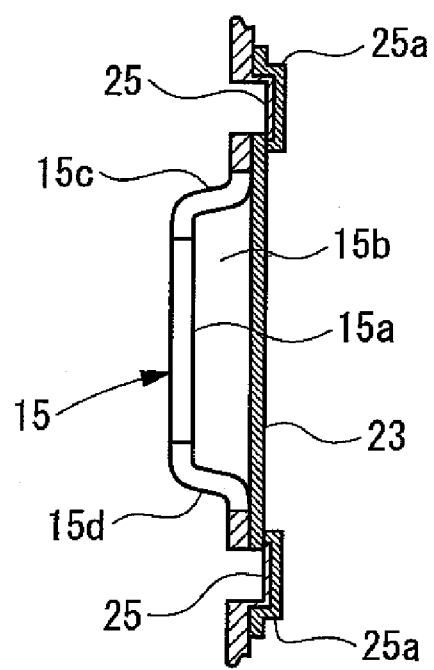
FIG. 9 is a sectional view taken along a line E-E in FIG. 7.
Figure 10:
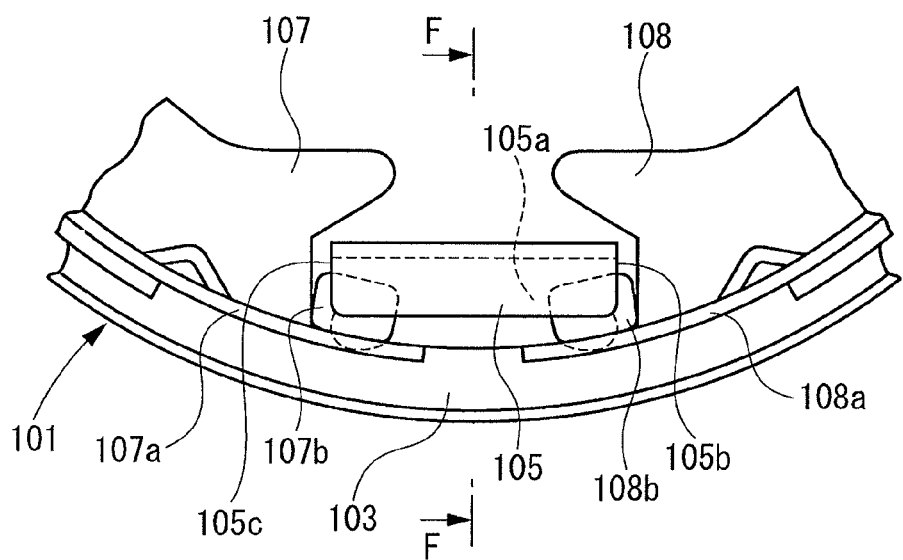
FIG. 10 is a main portion front view of a conventional drum brake apparatus.
Figure 11:
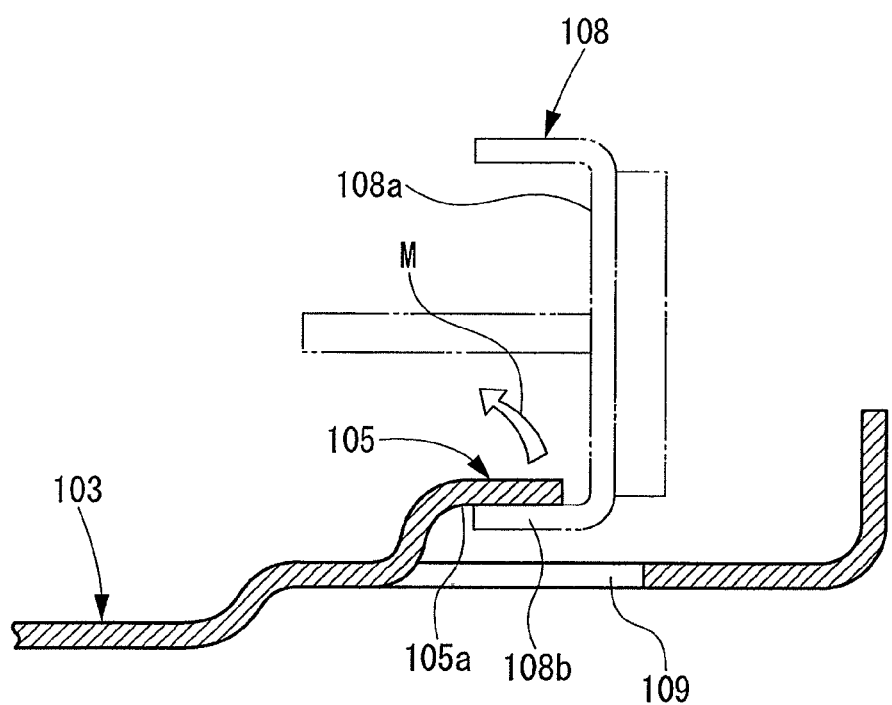
FIG. 11 is a sectional view taken along a line F-F in FIG. 10.

FIGS. 7 to 9 show another embodiment (second exemplary embodiment) of the shoe guide portion 15 in which the shapes of the both end portions 15c, 15d are improved.

In the first exemplary embodiment, as shown in FIG. 2, front edges 31c, 31d of the both end portions 15c, 15d of the shoe guide portion 15 slant so as to retreat gradually toward the backing plate 5. However, in the second exemplary embodiment, both end portions 15c, 15d are formed so that their front edges 31c, 31d are, in a position closer to a front edge 31a of a guide surface 15a, substantially parallel (do not retreat) to the front edge 31a.

By thus forming the front edges 31c, 31d, the overhanging shape of the guide surface 15a is relieved more than that in the first exemplary embodiment, and an advantage of increase in rigidity produced by the continuation of the both end portions 15c, 15d to the backing plate 5 can be enhanced.

The second exemplary embodiment is, except that the shape of the both end portions 15c, 15d of the shoe guide portion 15 is improved, common to the first exemplary embodiment. The common components are denoted by the same reference numerals, and the description of them is omitted.

While description has been made in connection with specific exemplary embodiments of the invention, it will be obvious to those skilled in the art that various changes and modification maybe made therein without departing from the

DESCRIPTION OF REFERENCE NUMERALS AND SIGNS

1 Drum brake apparatus
3,4 Brake shoe
3*b*, 4*b* Rim
5 Backing plate
6 Engagement projection
15 Shoe guide portion
15*a* guide surface
15*b* Inner end portion
15*c*, 15*d* Both end portions
21 aperture
23 reinforcement plate
25 Punching portion

What is claimed is:

1. A drum brake apparatus comprising:
   a backing plate;
   a brake shoe;
   a shoe guide portion formed integrally with the backing plate by cutting and press molding;
   a guide surface on a rear surface of the shoe guide portion; and
   an engagement projection formed on the brake shoe that slidably engages with the guide surface, wherein uplift of the brake shoe from the backing plate is prevented by engagement between the guide surface and the engagement projection;
   both ends of the shoe guide portion in a circumferential direction of the drum brake apparatus are formed continuous to the backing plate.

2. The drum brake apparatus according to claim 1, further comprising an inner end portion that is formed on the shoe guide portion at an inner end of the shoe guide portion in a radial direction of the drum brake apparatus and is continuous to the backing plate.

3. The drum brake apparatus according to claim 1, further comprising a reinforcement plate secured onto a rear surface of the backing plate so as to board up an aperture formed in the backing plate by the cutting and press molding of the shoe guide portion.

4. The drum brake apparatus according to claim 3, further comprising a punching portion at which the backing plate and the reinforcement plate are superimposed and bent together and the backing plate and the reinforcement plate are caulked and secured to each other.

* * * * *